United States Patent
Gresch et al.

(10) Patent No.: US 10,785,917 B2
(45) Date of Patent: Sep. 29, 2020

(54) CROP BALER WITH STUFFER COUNTERMASS

(71) Applicant: Deere & Company, Moline, IL (US)

(72) Inventors: Valentin Gresch, Ensheim (DE); Benedikt Jung, Kalserslautern (DE); Christian Waibel, Mannheim (DE)

(73) Assignee: DEERE & COMPANY, Moline, IL (US)

(*) Notice: Subject to any disclaimer, the term of this patent is extended or adjusted under 35 U.S.C. 154(b) by 239 days.

(21) Appl. No.: 15/809,265

(22) Filed: Nov. 10, 2017

(65) Prior Publication Data

US 2018/0125010 A1    May 10, 2018

(30) Foreign Application Priority Data

Nov. 10, 2016   (DE) .................. 10 2016 222 081

(51) Int. Cl.
*A01F 15/04*        (2006.01)
*A01F 15/08*        (2006.01)
(Continued)

(52) U.S. Cl.
CPC ............ *A01F 15/08* (2013.01); *A01D 89/002* (2013.01); *A01F 15/042* (2013.01);
(Continued)

(58) Field of Classification Search
CPC ....... A01D 89/002; A01F 17/02; A01F 15/00; A01F 15/02; A01F 15/04; A01F 15/042;
(Continued)

(56) References Cited

U.S. PATENT DOCUMENTS 2,552,888 A * 5/1951 Druetta ................... A01F 15/04
                                                        100/189
2,750,877 A * 6/1956 Nolt ........................ A01F 15/04
                                                        100/4
(Continued)

FOREIGN PATENT DOCUMENTS

DE           19621391 A1    12/1997
DE      102010054303 A1     6/2011
(Continued)

OTHER PUBLICATIONS

Search Report issued in counterpart application No. EP17198782.9, dated Apr. 3, 2018 (8 pages).

*Primary Examiner* — Robert E Pezzuto
*Assistant Examiner* — Adam J Behrens (57) ABSTRACT

A crop baler comprises a frame, a pressing chamber for crop, into which a stuffer can be introduced in order to compress the crop into a bale, a drive for producing a reciprocating movement of the stuffer, and a countermass coupled to the drive and configured to move in a counteracting direction to the movement of the stuffer, the countermass at least approximately compensates movement of the frame induced by the reciprocating mass of the stuffer and the drive unit thereof due to inertia. Alternatively or additionally, a flywheel mass of the drive can have a variable moment of inertia to similarly compensate movement of the frame induced by the reciprocating mass of the stuffer.

8 Claims, 4 Drawing Sheets

(51) Int. Cl.
*A01D 89/00* (2006.01)
*A01F 17/02* (2006.01)

(52) U.S. Cl.
CPC ........ *A01F 15/046* (2013.01); *A01F 15/0841* (2013.01); *A01F 17/02* (2013.01)

(58) Field of Classification Search
CPC .... A01F 15/046; A01F 15/06; A01F 15/0841; A01F 15/08
See application file for complete search history.

(56) References Cited

U.S. PATENT DOCUMENTS

| | | | | |
|---|---|---|---|---|
| 2,957,407 A | * | 10/1960 | Vutz | A01F 15/08 100/341 |
| 3,906,852 A | * | 9/1975 | Robinson, Jr. | A01F 15/042 100/98 R |
| 4,099,594 A | * | 7/1978 | Smith | A01B 71/066 180/14.1 |
| 5,363,757 A | * | 11/1994 | Newsom | B30B 9/3003 100/245 |

FOREIGN PATENT DOCUMENTS

| | | |
|---|---|---|
| DE | 102015205509 A1 | 9/2016 |
| DE | 102016218595 A1 | 3/2018 |
| EP | 1350658 A1 | 10/2003 |
| EP | 1431099 A1 | 6/2004 |
| EP | 1609349 A1 | 12/2005 |
| EP | 1658765 A1 | 5/2006 |
| EP | 2183955 A1 | 5/2010 |
| EP | 2502485 A1 | 9/2012 |
| EP | 2962543 A2 | 1/2016 |
| GB | 2242353 A | 10/1991 |
| JP | 61151823 A | 7/1986 |
| WO | 2014099909 A1 | 6/2014 |

* cited by examiner

CROP BALER WITH STUFFER COUNTERMASS

RELATED APPLICATIONS

This document claims priority based on German Patent Application No. 102016222081.0, filed on Nov. 10, 2016, which is hereby incorporated by reference into this application.

TECHNICAL FIELD

The present disclosure generally relates to a crop baler having a countermass to compensate contrary movements of a stuffer during operation of the baler.

BACKGROUND

Agricultural traction vehicles such as tractors typically comprise drive systems with drive engines that are used not only for propelling the traction vehicle, but also for driving a load. In particular, such a load can be a device for picking up and/or processing crop. This load can be separable from the actual traction vehicle and can be driven by the drive engine via a power takeoff shaft, as in the case, for example, of a baler that is towed by a tractor. The load is driven by the drive engine via a load drivetrain that contains (only) mechanical or (also) hydraulic or electrical force transmission elements. The traction vehicle is analogously propelled by the drive engine via a propulsion drivetrain, which likewise contains (only) mechanical or (also) hydraulic or electrical force transmission elements. The drive engine of the traction vehicle can be an internal combustion engine or an electric motor.

A consequence of the operation of the traction vehicle is that the power drawn by the load is not constant in all cases. Some loads require, due to their mechanical structure, temporally variable drive powers, as is the case, for example, with rectangular balers, in which a stuffer is periodically pressed into a pressing chamber in order to compress the crop to be pressed into a rectangular bale. Via the load drivetrain, the temporally varying power draw of the load induces changes in the rotational speed of the drive engine, which lead via the propulsion drivetrain to changing propulsion speeds of the traction vehicle. In addition, the stuffer moving periodically back and forth results in a continuous mass shift on the part of the rectangular baler, which alternately decelerates and accelerates the traction vehicle via the drawbar and the coupling elements.

Such changes of the propulsion speed of the traction vehicle are undesirable because they expose the operator of the traction vehicle to accelerations forward and backward. In addition to the linear acceleration, the cyclical variation of the travel speed produces pitching movements of the vehicle that deteriorate the driving comfort, particularly for agricultural tractors with front axle suspension. The components of the propulsion drivetrain, the tires of the traction vehicle and the coupling elements between the traction vehicle and a load towed thereby are also heavily stressed by the continuous changes of speed and therefore wear out quickly.

In European Patent Application No. EP 1 609 349 A1, European Patent Application No. EP 1 658 765 A1, and European Patent Application No. EP 2 183 955 A1 there have been approaches proposed for prospectively controlling the engine power on the basis of the load on the load drivetrain in order to adapt the power of the traction vehicle drive engine during changes of load, i.e. increasing it during load peaks and decreasing it when the load decreases. It was also proposed in German Patent Application No. DE 10 2015 205 509 A1 to compensate pitching movements of a traction vehicle induced by unevenness in the ground or reciprocating speed changes by using countervailing speed changes, while German Patent Application No. DE 10 2016 218 595 A1, which was published subsequently, proposes controlling the speed of the traction vehicle on the basis of detected or expected load changes by adapting the transmission ratio of the propulsion drivetrain.

However, it has been found in practice that, in particular, speed variations of the traction vehicle that are caused by the periodic movement of the stuffer of a rectangular baler forward and backward cannot be completely eliminated by a controller. The disruption induced by the stuffer is relatively large and, since it occurs twice per pressing cycle at the two reversal points of the stuffer, it also contains higher frequency components, the upper limit frequency of which is on the order of 1 Hz, which cannot be compensated in a satisfactory manner by countervailing controller adjustments of the drive engine speed and/or of the drivetrain. The above-mentioned pitching movements also cannot be compensated satisfactorily by control of the transmission or by predictive control of the internal combustion engine. The transmission ratio can be adjusted such that the pitching movements are minimized, but then the longitudinal acceleration cannot be simultaneously minimized.

In some approaches, the stuffer of the rectangular baler is driven via the power takeoff shaft of the traction vehicle and a transmission that drives the stuffer via a crank and a connecting rod. The power takeoff shaft additionally drives a relatively large flywheel mass. Masses at the output side of the transmission are present in certain cases (e.g. in the form of a solid ring on which a bearing eye for the connecting rod is cast and which is driven by the transmission output shaft; cf U.S. Pat. No. 9,456,552) and move together with the crank, but are arranged on the side of the crank diametrically opposite that of the connecting rod and accordingly move forward when the stuffer moves backward and vice versa, and thus counteract to a certain extent the shifts of mass by the rectangular baler that are induced by the stuffer; however, the mass of the stuffer is considerably larger than the counteracting masses and therefore the above-mentioned problem cannot be satisfactorily solved by said counteracting masses.

Another problem for rectangular balers is that the flywheel mass must have a relatively large moment of inertia in order to provide the energy necessary at the impact of the stuffer against the crop, without an excessively large stress on the load drivetrain. This relatively large moment of inertia leads to startup problems after engaging the power takeoff clutch. Therefore, separate drives (e.g., German Patent Application No. DE 196 21 391 A1) are used for starting up the flywheel mass, but they are relatively expensive. Flywheel masses with variable moment of inertia, in which the masses move radially outward due to centrifugal force against the force of a spring, which leads to low moments of inertia when idling and starting up and to larger moments of inertia at higher rotational speeds, are known per se (Japanese Patent Application No. JP S 61 151 823 A1 and United Kingdom Patent Application No. GB 2 242 353 A), but not in the context of rectangular balers.

The problem addressed by the present disclosure is considered to be the provision of a crop baler in which the aforementioned disadvantages are not present or are present only to a reduced extent.

SUMMARY

Various aspects of examples of the present disclosure are set out in the claims. According to a first aspect of the present disclosure, a crop baler comprises a supporting frame that can be moved across a field, crop pick-up configured to pick up crop from the ground of the field, a conveyor configured to convey crop picked up by the crop pick-up, a pressing chamber for crop, into which a stuffer can be alternately introduced and again retracted in order to compress the crop conveyed by the conveyor into the pressing chamber into the form a bale, a drive for producing the reciprocating movement of the stuffer, a countermass coupled to the drive and moving in a counteracting direction to the movement of the stuffer, and which, for example, moves in a first direction when the stuffer moves in a second direction opposite the first direction and vice versa. The reciprocating masses of the stuffer and the countermass thereof result in a contrary (counteracting) movement of the frame due to the mass moment of inertia, which movement is reduced by the countermass. The countermass is configured such that it at least approximately compensates said movement of the frame.

According to a second aspect of the present disclosure, a crop baler comprises a supporting frame that can be moved across a field, a crop pick-up configured to pick up crop from the ground of the field, a conveyor configured to convey crop picked up by the crop pick-up, a pressing chamber for crop, into which a stuffer can be introduced in order to compress the crop conveyed into the pressing chamber by the conveyor into the form a bale, and a drive for producing a reciprocating movement of the stuffer, and comprises a flywheel mass, wherein the flywheel mass has a variable moment of inertia. During starting up of the crop baler, the flywheel mass has a small moment of inertia, which facilitates the coupling and starting up process. The moment of inertia thereof increases with increasing rotational speed in order to stabilize the driving of the stuffer.

According to another aspect of the present disclosure, a crop baling system comprises a traction vehicle and a crop baler coupled to the traction vehicle. The crop baler comprising a stuffer, a drive configured to produce a reciprocating movement of the stuffer and a countermass coupled to the drive and the countermass configured to move in a counteracting direction to the movement of the stuffer. The system further comprising a controller configured to adjust the operation of the traction vehicle based on the movements of the stuffer and countermass to main a target speed value.

BRIEF DESCRIPTION OF THE DRAWINGS

The detailed description of the drawings refers to the accompanying figures in which.

DETAILED DESCRIPTION

Figure 1:
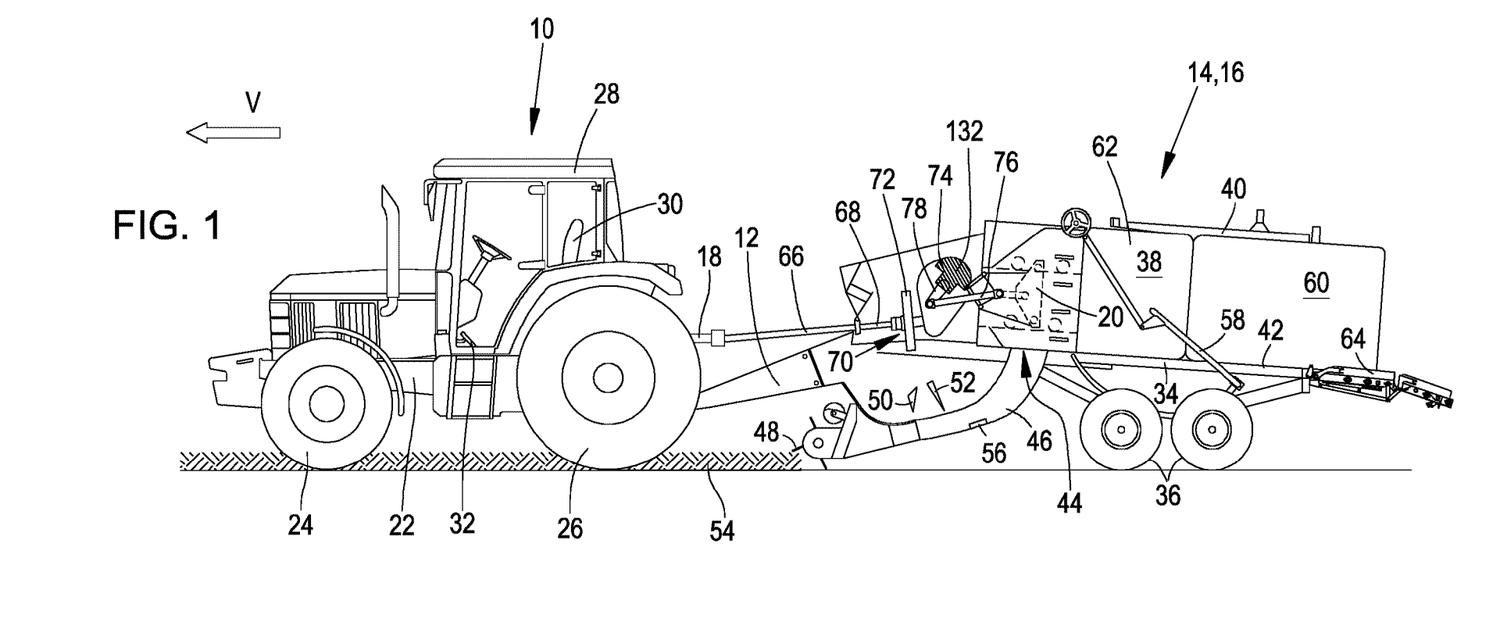
FIG. 1 shows a side view of a traction vehicle in the form of a tractor, with a towed load in the form of a crop baler.

FIG. 1 shows an agricultural traction vehicle 10 in the form of the tractor, which is towing a load 14 in the form of a crop baler 16 via a drawbar 12. A power takeoff 18 is used for driving movable elements of the load 14 and in particular a stuffer 20. The traction vehicle 10 is constructed on a frame 22, which is supported on steerable front wheels 24 and drivable rear wheels 26 and bears a cab 28, in which an operator workstation 30 is located. Using an input device 32 in the form of a pedal or a driving lever, which can specify a target speed without continuous user interaction, the propulsion speed of the traction vehicle 10 can be specified in the manual operating mode by an operator.

The crop baler 16 in one example is used for producing square, rectangular or cuboid bales. The crop baler 16 has a frame 34 that is supported on ground support wheels 36 in a tandem arrangement. The drawbar 12 is connected to the frame 34, extends forward therefrom and is designed such that it can be connected to the traction vehicle 10, which is equipped with the power takeoff 18 in order to provide power for driving various driven components of the crop baler 16. A pressing chamber 38 with a rectangular cross section is formed in part by an upper part 40 of the housing and a lower part 42 of the housing, wherein the lower part 42 of the housing is provided with a crop inlet 44 to which a curved supply channel 46 is connected. The side walls of the pressing chamber 38 and/or the housing upper part 40 can be arranged rigidly or can be adjustable by actuators, not shown, so that the cross section of the pressing chamber 38 is variable. By adjusting the actuators, the lateral contact pressure on the bale part 62, and thus the pressing density, can be varied. The lateral contact pressure also acts on the already bound bale 60. This increases the resistance force acting against the movement of the bale 60 out of the pressing chamber and thus also increases the pressing density of the new bale 62.

A supply device has a crop pickup 48 configured to pick up crop from the ground of the field, in the form of a receiver having an associated hold-down, and a crop conveyor 50, 52 in the form of a compressor fork 50 and a loading fork 52 for conveying crop picked up by the crop pickup. The crop pickup 48 comprises an auger conveying to the center and are arranged in front of the supply channel 46 in order to pick up a swath 54 of crop from the ground and transfer it to the compressor fork 50, which is used to compress crop in the supply channel 46 until a load with a preselected density has collected in the supply channel 46 and is stuffed by the loading fork 52 via a crop inlet 44 into the pressing chamber 38. At a front lower part of the supply channel 46, a spring-loaded flap 56 is pivotably mounted, which pivots, depending on the density of the crop situated in the supply channel 46, and indicates, as soon as a desired pressed crop density has been achieved in the supply channel 46, in order to effect, via a monitoring unit 98 (cf FIG. 2), the powering up of an electrical control circuit that creates an appropriate driving connection, which activates the loading fork 52 such that the load of crop is moved into the pressing chamber 38. An electrical actuation of the loading fork 52 is described in United States Patent Publication No. 2016/0088798 A1, for example. In other balers available on the market, the loading fork 52 is triggered mechanically. Directional indications such as front and rear refer below to the forward direction of the traction vehicle 10 and the crop baler 16, which runs to the left in FIG. 1.

When the load of crop has been introduced into the pressing chamber 38, the stuffer 20 is actuated temporally after the loading fork 52 by a suitable drive 70 in a controlled sequence, in order to move the crop to the rear in the pressing chamber 38, where it is compressed in a stack. Once the stack of compressed material has reached a preselected length, a needle assembly 58 containing a plurality of curved needles is actuated to supply multiple binding twine strands to a corresponding number of knotters, not shown, which operate by wrapping the lengths of twine around the stack in order to form a bale 60 that is ready for discharge, which happens if it is pressed by a bale part 62, not shown, out of the rearward end region of the pressing chamber 38 when it increases in length, because new loads of crop are being stuffed into the baling chamber 38.

The stuffer 20 is designed for a reciprocating movement into the pressing chamber 38 between a retracted position in front of the crop inlet 44 and a partially extended position (shown in FIG. 1) above the crop inlet 44, from which it can again move farther to the rear until it impacts against a bale part 62. The reciprocating movement of the stuffer 20 normally runs along the forward direction of the crop baler 16, although in other examples, the movement can be transverse to the forward direction of the baler in either the horizontal plane or vertical plane. The result of this movement of the stuffer 20 is that loads of crop that are introduced into the pressing chamber 38 from the supply channel 46 are compressed against a stack of crop, which includes the partially formed bale part 62 and/or the complete bale 60. For protective deposition of the bale 60 onto the ground, a depositing device 64 is mounted at the rear end of the frame 34 as a rearward prolongation of the housing lower part 42.

Figure 2:
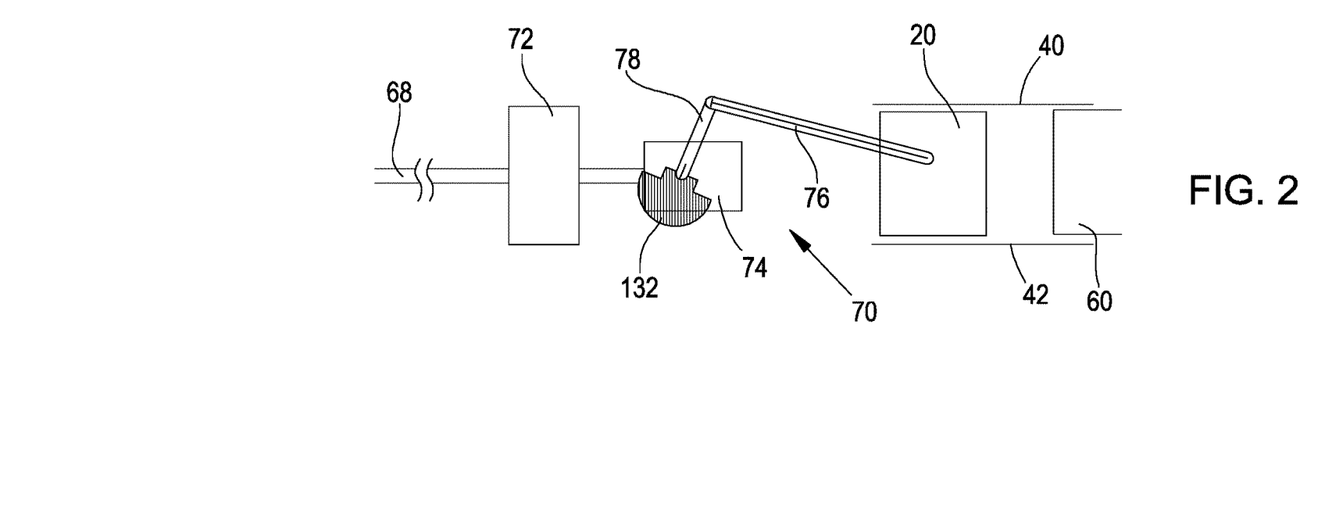
FIG. 2 shows an enlarged side view of the drive for the crop baler.

The stuffer 20 is driven via the power takeoff 18 of the traction vehicle 10, which drives an input shaft 68 of a drive 70 of the stuffer 20 via a jointed shaft 66. The input shaft 68 drives a flywheel 72 and, via a transmission 74, a crank 78, the movement of which is transmitted via a connecting rod 76 to the stuffer 20. These elements form the drive 70 of the stuffer 20.

A countermass 132 is connected to the crank 78, and is diametrically opposite the crank 78 and rigidly connected to the crank 78. If the stuffer 20 moves forward, the counteracting mass 132 moves to the rear and vice versa. The countermass 132 is dimensioned such that the product of the mass of the countermass 132 (measurable in various units of measurement such as, for example, kilograms or pounds) and of the horizontal speed component (measurable in various units of measurement such as, for example, meters per second or feet per second) thereof is equal to the product of the horizontal speed component and masses of the stuffer 20 and the drive 70 thereof (i.e. the crank 78 and the connecting rod 76), but in the opposite direction. This condition applies particularly to the front and rear reversal points of the stuffer 20, because the acceleration and thus the inertial forces active are largest there. This has the effect that the movement of the crop baler 16 induced on the frame 34 by the reciprocating mass of the stuffer 20 of a crop baler is compensated (canceled out) at least approximately. This results in quieter running of the traction vehicle 10, and the load on the towbar 12 and the coupling elements connecting it to the traction vehicle 10 becomes more uniform.

Alternatively or additionally, however, a linearly moving countermass could be used, which is driven via an associated second crank rod and a second connecting rod that rotate with a phase offset by 180° relative to the phase of the stuffer. It would additionally be conceivable to drive the stuffer by a linear drive, e.g. a hydraulic cylinder. In this embodiment, the countermass can be driven by a second linear drive synchronized mechanically, hydraulically and/or electronically with the linear drive of the stuffer, or a suitable mechanism, hydraulic system or electrical system can convert the movement of the linear drive into the opposing movement of the countermass.

Figure 3A:
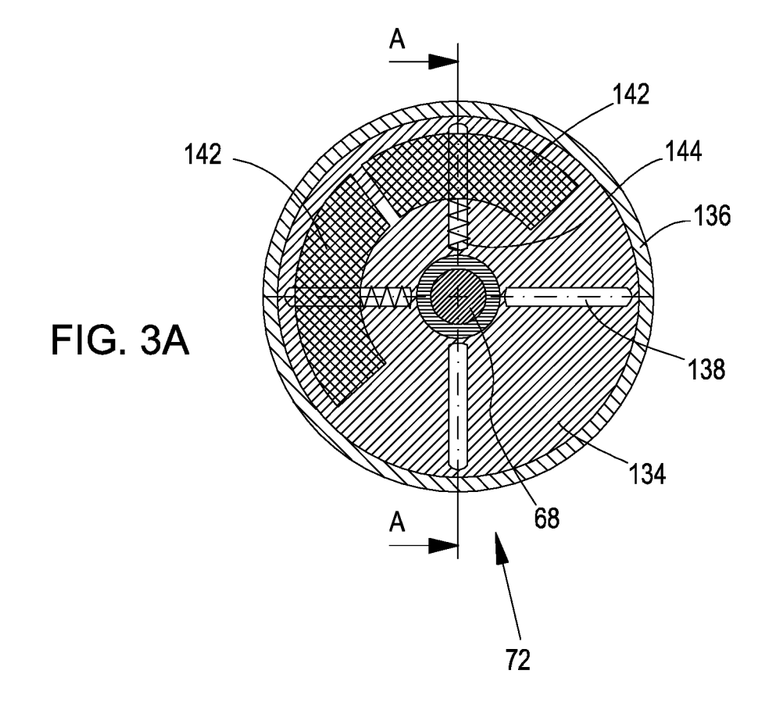
FIG. 3a shows a frontal view of a flywheel mass of the drive for the crop baler.
Figure 3B:
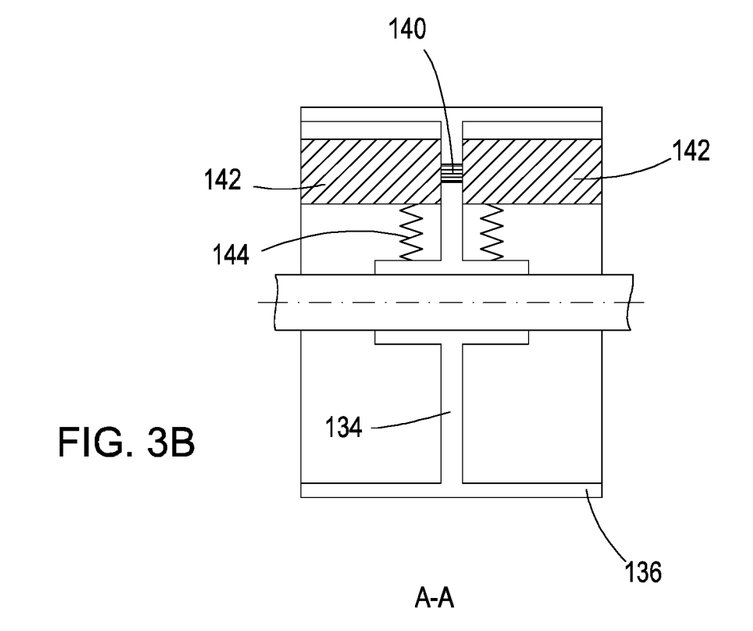
FIG. 3b shows a cross section through the flywheel mass of FIG. 3a along the line A-A.

In order to allow a sufficiently large moment of inertia of the flywheel mass 72, it has a variable moment of inertia, with regard to which the reader is referred to FIGS. 3a and 3b. A radially extending support plate 134, which is connected to an outer ring 136, is fastened to the input shaft 68. The support plate 134 comprises four slots 138, through which connecting pieces 140 that connect two rotational masses 142 extend. The rotational masses 142 are pulled inward by tensile springs 144. Contrary to what is shown in FIGS. 3a and 3b, rotational masses 142 are distributed uniformly about the input shaft 68 in order to avoid a nonuniform movement of the flywheel mass 72. When the flywheel mass 72 is stationary or rotates only slowly, the rotational masses 142 are pulled by the tensile springs 144 inward toward the input shaft 68. The moment of inertia of the flywheel mass 72 is then relatively small, which facilitates starting up of the rotational movement of the flywheel mass 72 after engagement of a clutch 90 (cf FIG. 4). With increasing rotational speed, the rotational masses 142 move radially outward, relative to input shaft 68, due to the centrifugal forces acting on them against the force of the tensile springs 144, which increases the moment of inertia and the rotational energy of the flywheel mass 72. The springs 144 are preferably designed such that the masses contact the ring 136 serving as the outer delimitation starting from a rotational speed of approximately 80% of the target rotational speed. This ensures that the inertia of the flywheel mass 72 remains constant even if there are certain fluctuations of the rotational speed of the drivetrain. In place of tensile springs 144 or in addition thereto, it would also be possible to use compression springs that are arranged between the ring 136 and the rotational masses 142.

Figure 4:
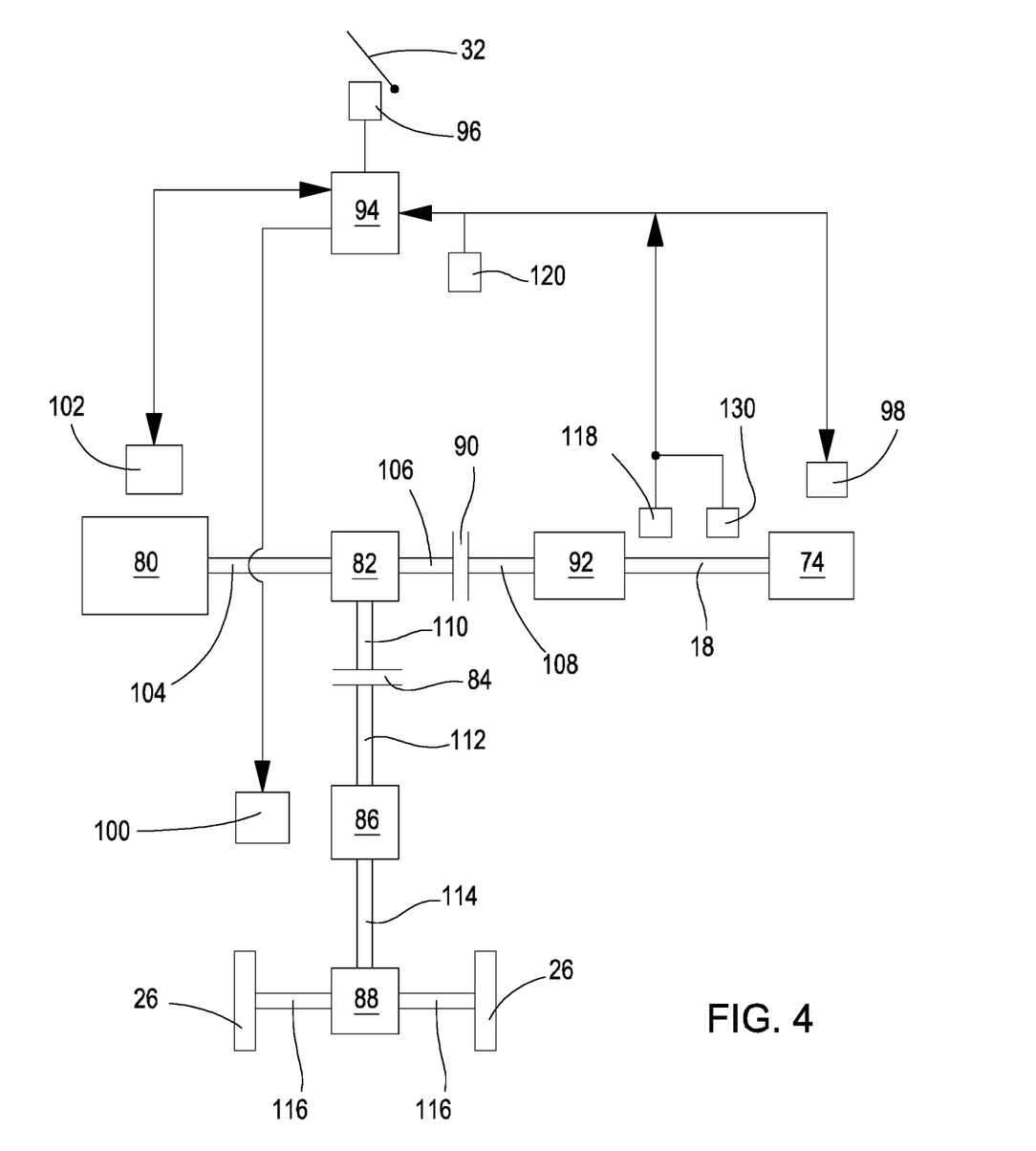
FIG. 4 shows a diagram of the drive system for the traction vehicle.

FIG. 4 shows a diagram of the drive system of the traction vehicle 10 and the load 14. A drive engine 80 of the traction vehicle 10, which can be designed as an internal combustion (diesel) engine or as an electric motor, drives with the output shaft 104 thereof a transfer case 82 having a first propulsion output shaft 110 and a load output shaft 106. At one of the shafts 110 or 106, the transfer case 82 can contain a direct connection to the output shaft 104. The propulsion output shaft 110 drives, via a drive clutch 84, a transmission input shaft 112, which drives a propulsion transmission 86 (designed as a power shift transmission or an infinitely variable transmission, for example) having a variable transmission ratio and driving, on the output side, the rear wheels 26 via a shaft 114, a differential transmission 88 and a wheel driveshaft 116. The propulsion transmission 86 can optionally also drive the front wheels 24 via at least one drive that is not shown. The load output shaft 106 is drivingly connected via a power takeoff clutch 90 and a power takeoff transmission 92 to the power takeoff shaft 18, which is used for driving the transmission 74 of the drive 70 and additional driven elements of the load 14.

The transfer case 82, the propulsion output shaft 110, the clutch 84, the propulsion transmission 86, the shaft 114, the differential transmission 88 and the wheel driveshafts 116 form a propulsion drivetrain that can be driven by the drive engine 80 for driving propulsion wheels or tracks 26 of the traction vehicle 10, which drivetrain has a transmission ratio that can be varied by the actuator 100. The transfer case 82, the load output shaft 106, the clutch 90, the power takeoff transmission 92, the power takeoff shaft 18 and the transmission 74 (with the downstream components for driving the stuffer 20) form a load drivetrain that can be driven by the drive engine 80 for driving the load 14, which, as described below, has a variable power consumption over time that causes a change of the rotational speed of the drive engine 80.

An electronic controller 94 is connected to a control unit 98 of the load 14 (round baler 16), an actuator 100 for adjusting the transmission ratio of the propulsion transmission 86, an engine controller 102, a speed specification sensor 96 for detecting the position of the input device 32, and actuators, not shown for reasons of clarity, for closing and opening the clutches 84 and 90, although the latter can also be actuated by hand or by foot by the operator.

As described above, the stuffer 20 of the load 14 is moved periodically into the pressing chamber 38 at a frequency on the order of 1 Hz and presses against the bale part 62. Since this requires relatively high power, this stress is propagated via the load drivetrain up to the drive engine 80, which responds with changes of speed. These speed changes lead via the propulsion drivetrain to propulsion speed changes of the traction vehicle 10, which are noticed disadvantageously by the operator. Due to inertial forces, the movement of the mass of the stuffer 20 also causes periodic acceleration and deceleration of the entire crop baler 16, which are propagated to the traction vehicle 10. In both cases, the driver of the traction vehicle 10 experiences this effect at the operator work station 30 both acoustically and in the form of longitudinal accelerations and in pitching movements of the traction vehicle 10 due to the elasticity of the tires of wheels 24, 26 and possibly a front axle suspension system.

For reasons of driving safety and driving comfort, there are a number of suspension systems that reduce vibrational loads acting on the traction vehicle 10 or the driver. Most of the suspension systems have a passive or semi-active action and cancel out the vertical dynamics of the driver. There are also active systems and suspension systems that address other degrees of freedom such as pitching, rolling or yawing or the transverse and longitudinal dynamics. Such systems are relatively elaborate, however, and cannot completely extinguish the movement.

The service life of the vehicle 10 and its components suffers if there are load peaks in the longitudinal dynamics. Due to such cyclical loads, the towing eye of the drawbar 12 on the frame 22 often moves from one end position to the other if the coupling is subject to play. Consequently, the amplitude of the cyclical force increases each time, which affects both the wear and the long-term strength of the coupling equipment, as well as the comfort of the driver. This effect of course also applies to all other cyclically stressed components in the entire propulsion drivetrain, including the tires. From the point of view of the driver of the vehicle 10 and the load 14, it is therefore of great interest to reduce the amplitude of the longitudinal dynamics and the pitching movements, particularly for cyclically recurring loads. It is therefore desirable that the traction vehicle 10 should be able to detect a regularly recurring external load—caused by inertial forces or the induced torque—automatically, and to eliminate resultant periodic longitudinal accelerations or pitching movements.

Figure 5:
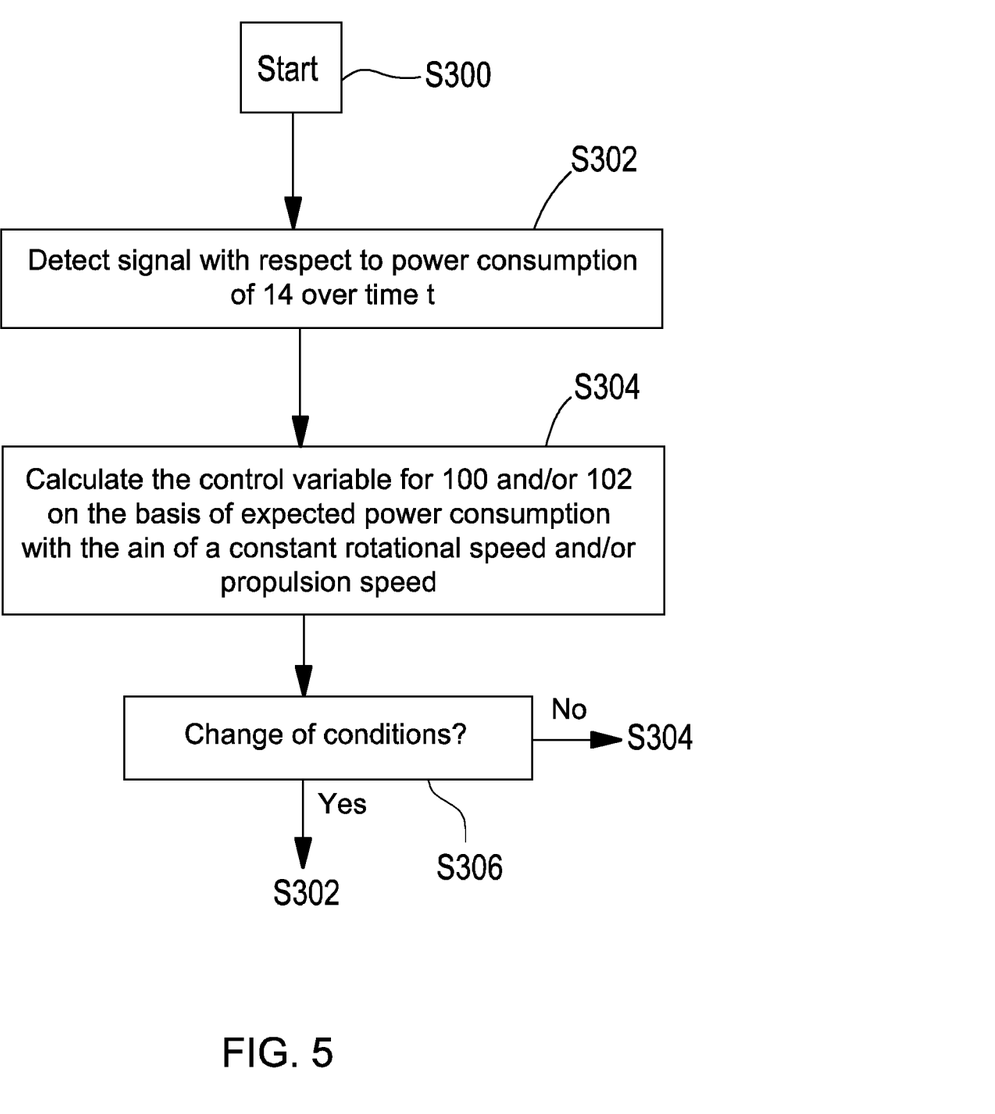
FIG. 5 shows a flow chart according to which the control unit of the drive system operates.

FIG. 5 shows a flow diagram according to which the controller 94 proceeds in operation. After the start in step S300 and selection of an automatic operating mode by the operator using an appropriate input into a user interface, not shown, the traction vehicle 10 is driven in step S302 with the load 14 (crop baler 16) across a field and crop is picked up in the process and pressed into bales 60. The propulsion speed of the traction vehicle 10 is specified initially by the input device 32, the position of which is detected by the speed specification sensor 96 and supplied to the controller 94. The controller 94 commands the engine controller 102 and the actuator 100 in a manner known per se, i.e. the rotational speed of the drive engine 80 is brought to at least one target value that leads to a suitable rotational speed of the power takeoff shaft 18, and the actuator 100 is brought into a position in which the desired propulsion speed is achieved. If the power takeoff transmission 92 has a transmission ratio that can be varied by an actuator, the controller 94 can also control the associated actuator of the power takeoff transmission 92, which enables an additional degree of freedom for adjusting the rotational speed of the drive engine 80 to at least one target value with favorable fuel consumption.

The power consumption of the load 14 can be detected in step S302 on the basis of a torque sensor 118 that measures the torque transmitted by the power takeoff 18 (and/or on the basis of a load sensing pin that measures the pressing force of the stuffer 20). It would also be conceivable to detect the rotational speed of the drive engine 80 (indicating the drawn power), which can be transmitted to the controller 94 by the engine controller 102. Both procedures can also be combined, or it is possible to use a different method known in the art for determining the load on the drive engine 80. The controller 94 records during step S302 the measured torque over time for a time span t, which can be on the order of 10 seconds. The recording time period is selected such that it includes multiple periods of the load fluctuations.

Based on this recording, the controller 94 is then capable in step S304 of estimating the power that will be drawn by the load 14 in the future as a function of time. In this regard, the disclosure of European Patent Application No. EP 2 183 955 A1, which is incorporated into the present documents by reference in its entirety, is an example of how the influence of the picked-up crop quantities in the crop baler 16 can be taken into consideration or not considered. In order to reduce or avoid the undesirable longitudinal accelerations and/or pitching movements of the traction vehicle 10, the controller 94 controls the actuator 100 in step S304 such that the transmission ratio of the propulsion transmission 86 is adjusted such that the longitudinal accelerations and/or pitching movements of the traction vehicle 10 that are caused by the load change are compensated as accurately as possible. The transmission ratio of the propulsion transmission 86 is accordingly changed at the proper time in order to accelerate the traction vehicle 10 if the power drawn by the load 14 increases and, analogously, the transmission ratio of the propulsion transmission 86 is reduced at the proper time in order to decelerate the traction vehicle 10 if the power drawn by the load 14 decreases. The propulsion speed of the traction vehicle 10 thus remains constant over time, despite the cyclical changes of the power drawn by the load.

Thus, the propulsion speed change of the traction vehicle 10 is not compensated and held constant in the present invention by a control loop based on a measurement of the current speed (as is known for example from European Patent Application No. EP 1 350 658 A1), which adjusts the transmission ratio of the propulsion transmission 86 in order to hold the propulsion speed of the traction vehicle 10 constant in the event of load changes. Such a control loop could cause dynamic interactions with a control loop for holding the rotational speed of the drive engine 80 constant and stability would thereby be difficult to establish. Instead of that closed control loop, an open control loop is used, with the expected power consumption of the load 14 or a signal dependent thereon as the input variable, in order to be able to predictively compensate the speed changes resulting from the changing power consumption.

The controller 94 can command the engine controller 102 in step S304 such that the engine controller holds the rotational speed of the drive engine 80 constant by a control loop based on the detected rotational speed (i.e. does not undertake a predictive compensation of the engine rotational speed by means of an open loop for detecting the load, as provided in European Patent Application No. EP 2 183 955 A1), or (alternatively or additionally to the described propulsion speed monitoring) can undertake a predictive, at least partially load-compensating regulation of the rotational speed of the drive engine 80 with an open control loop, analogously to European Patent Application No. EP 2 183 955 A1.

Step S306 follows, in which there is a query as to whether a change of the external conditions, such as a change of the density of the swath 54 or the moisture thereof, has taken place. This change can be detected by the fact that the regulation in step S304 no longer functions optimally, which can be detected by a suitable inertial sensor 120 of the traction vehicle 10. If the conditions have not changed, step S304 follows, and otherwise, step S302. The automatic control in step 304 can be interrupted by a user input, e.g. by manual speed input using the input device 32.

In view of all of this, the operation of the crop baler 16 is improved by the countermass 132, because, due to the mechanical compensation of the effects of the movement of the stuffer 20 by the countermass 132, vibrations of the crop baler 16 are substantially reduced, which also improves the regulation of the propulsion speed of the traction vehicle 10 and/or of the rotational speed of the drive engine 80 by the controller 94, because the periodic interference from conventional crop balers 16 that is caused by the stuffer 20 and transmitted to the traction vehicle 10 is largely eliminated. The above-described flywheel mass 72 facilitates starting the drive of the crop baler 16.

Having described one or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The invention claimed is:

1. A crop baler with a stuffer countermass for baling a crop, the crop baler comprising:
    a supporting frame that is capable of moving across a field;
    a crop pick-up configured to pick up the crop from a ground of the field;
    a conveyor configured to convey the crop picked up by the crop pick-up;
    a pressing chamber configured to receive a stuffer, the stuffer compressing a crop conveyed into the pressing chamber by the conveyor into a form of a bale;
    a drive configured to produce a reciprocating movement of the stuffer;
    a control unit coupled to the drive and a controller, the control unit to obtain a pressing force measurement of the stuffer during the reciprocating movement, the pressing force indicative of a power consumption of the stuffer, the controller to generate an input variable based on the power consumption that adjusts the movement of the supporting frame across the field;
    a countermass coupled to the drive, the countermass configured to move in a counteracting movement to the reciprocating movement of the stuffer; and
    wherein the reciprocating movement of the stuffer and the counteracting movement of the countermass during operation results in a contrary movement of the supporting frame due to a moment of inertia, wherein the contrary movement of the supporting frame is reduced by the countermass and by the input variable.

2. The crop baler according to claim 1, wherein the drive further comprises a transmission, a crank that is capable of being driven by the transmission, and a connecting rod drivingly connecting the crank to the stuffer.

3. The crop baler according to claim 2, wherein the countermass rotates with the crank and the connecting rod.

4. The crop baler according to claim 1, wherein the reciprocating movement of the stuffer is parallel to a forward direction of travel of the crop baler and the movement of the countermass is in a direction opposite the stuffer.

5. The crop baler according to claim 1, further comprising a drawbar extending from the supporting frame and a power take off shaft coupled to the drive, wherein the drawbar and the power take off shaft are configured to be connected to a traction vehicle.

6. The crop baler according to claim 1, wherein the countermass is dimensioned such that a product of a mass and a horizontal speed component of the countermass is equal to a product of a mass and a horizontal speed component of the stuffer.

7. The crop baler according to claim 1, further including a flywheel mass coupled to the countermass and the stuffer, the flywheel mass to drive the reciprocating movement of the stuffer.

8. The crop baler according to claim 7, wherein the flywheel mass includes a variable moment of inertia.

* * * * *